United States Patent
Brummans et al.

(10) Patent No.: US 6,394,504 B1
(45) Date of Patent: May 28, 2002

(54) CLAMPLESS FLUID TRANSFER HOSE COUPLING

(75) Inventors: John L. Brummans, Warren; Steven M. Haar, White Lake; Scott D. Wixom, Oxford; Thomas K. Lockwood, Fenton, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/542,814

(22) Filed: Apr. 4, 2000

(51) Int. Cl.[7] .............................. F16L 27/00; F16L 5/00; F16L 3/04
(52) U.S. Cl. .................. 285/136.1; 285/13; 285/14; 285/93; 285/137.11; 285/319; 285/921; 285/924
(58) Field of Search ................................ 285/319, 921, 285/136.1, 137.11, 13, 14, 93, 924

(56) References Cited

U.S. PATENT DOCUMENTS

| | | | | |
|---|---|---|---|---|
| 484,764 A | * | 10/1892 | Elder | 175/324 |
| 1,167,832 A | * | 1/1916 | Martin | 285/93 |
| 2,869,099 A | * | 1/1959 | Robinson | 439/357 |
| 3,718,350 A | * | 2/1973 | Klein | 285/39 |
| 3,860,268 A | * | 1/1975 | Zeman | 285/14 |
| 4,111,464 A | * | 9/1978 | Asano et al. | 285/111 |
| 4,275,907 A | * | 6/1981 | Hunt | 285/18 |
| 4,423,892 A | * | 1/1984 | Bartholomew | 285/319 |
| 4,589,684 A | * | 5/1986 | Nowacki et al. | 285/319 |
| 4,964,305 A | * | 10/1990 | Raulins | 73/761 |
| 4,978,149 A | * | 12/1990 | Sauer | 285/110 |
| 5,064,223 A | * | 11/1991 | Gross | 285/93 |
| 5,113,900 A | * | 5/1992 | Gilbert | 137/515.5 |
| 5,314,210 A | * | 5/1994 | Calmettes et al. | 285/93 |
| 5,607,190 A | * | 3/1997 | Exandier et al. | 285/93 |
| 5,662,360 A | * | 9/1997 | Guzowski | 285/110 |
| 5,775,741 A | * | 7/1998 | Rice et al. | 285/272 |
| 5,988,704 A | * | 11/1999 | Ryhman | 285/307 |

FOREIGN PATENT DOCUMENTS

WO    WO 97/24545    *    7/1997

\* cited by examiner

*Primary Examiner*—B. Dayoan
*Assistant Examiner*—Carlos Lugo
(74) *Attorney, Agent, or Firm*—Laura C. Hargitt

(57) ABSTRACT

A clampless coupling which attaches a hose to a nipple without need of a clamp at the end of the hose to ensure sealing, including a connector and a nipple of a fluid system component. The connector is sealingly pre-connected at one end with a hose; the opposite end is in the form of a sleeve. The sleeve features a notch at its forward end, a boss on a resilient lock arm, and an O-ring seal. The nipple has a pocket depressionally formed on its outside nipple surface and an alignment tab. In operation, a user slides the sleeve over the nipple by pressing the connector toward the near end of the nipple. As the sleeve slides over the nipple, the tab is received by the notch to align the connector with the nipple, the boss drops abuttably into the pocket, and the O-ring seal sealingly compresses between the nipple and the connector. A seal assurance feature reveals improper connection when a pressure test is undertaken.

18 Claims, 5 Drawing Sheets

CLAMPLESS FLUID TRANSFER HOSE COUPLING

TECHNICAL FIELD

The present invention relates to couplings used to connect a fluid transfer hose to a nipple of a fluid system component, and more particularly to a coupling sealingly secured to a nipple without use of a clamp.

BACKGROUND OF THE INVENTION

The transfer of fluids from a first fluid system component to a second fluid component is conventionally accomplished utilizing a hose for interconnecting the two. In this regard, each end of the hose must be sealingly engaged with a respective one or the other of the first and second fluid system components. For example, a typical automotive situation is the utilization of flexible hoses to connect the radiator to the engine block, wherein two hoses are used, one each for fluid flow into and out of the radiator. At each end of each hose the hose is slipped tightly over a nipple, whereupon a clamp is used to tighten the hose with respect to the nipple to ensure prevention of fluid leaking from the hose end. The two most common kinds of clamps are an annular wire clamp which is size adjusted by an interconnected nut and bolt, and an annular band having serrated notches which interface with a screw to provide size adjustment.

Problematically, a clamp must be supplied at each end of each hose, and frequently it is inconvenient to drive the bolt or screw associated therewith due to surrounding obstructions or general inaccessibility. Further, in time the clamps are subjected to corrosion, and frequently cannot be easily loosened from the hose should servicing of the hose ever be needed. In any event, the use of clamps to ensure hose sealing is an ergonomically inefficient expenditure of time and labor.

Accordingly, it would be desirable if somehow a hose could be attached sealingly to a nipple without need of a clamp.

SUMMARY OF THE INVENTION

The present invention is a clampless coupling which attaches a hose to a nipple without need of a clamp at the end of the hose to ensure sealing.

The clampless coupling according to the present invention includes a connector which is sealingly pre-connected at one end with an end of a hose, as for example by an adhesive. The other opposite end of the connector is in the form of a sleeve, wherein the sleeve features a resilient lock arm and an alignment notch. The lock arm has a boss which protrudes with respect to the inside sleeve surface. An O-ring seal is trapped by an annular groove at the inside sleeve surface, wherein the O-ring seal protrudes with respect to the inside sleeve surface.

The clampless coupling further features a nipple of a fluid system component, wherein the nipple has a pocket depressionally formed on its outside nipple surface and an alignment tab located remotely from the distal end of the nipple. The sleeve is sized to be slipped over the nipple with but little play therebetween.

In operation, a user slides the sleeve over the nipple by pressing the connector toward the near end of the nipple. As the sleeve slides over the nipple, the resilient lock arm is resiliently pushed up away from the outer nipple surface by abutment therewith by the boss. Continued sliding of the sleeve results in the O-ring seal sealingly compressing against the outer nipple surface in one direction, and the floor of the annular groove in the other, opposite, direction. Still further sliding of the sleeve results in the alignment notch commencing to receive the alignment tab and, shortly thereafter, the boss dropping into the pocket. When the boss becomes firmly seated in the pocket, the O-ring seal provides secure sealing between the sleeve and the nipple, the boss prevents the connector from backing-off from the nipple, and the interaction of the alignment notch and tab prevent axial rotation of the connector (and hose) with respect to the nipple. A seal assurance feature in the form of a slot at the distal end of the nipple reveals improper connection when a pressure test is undertaken.

Accordingly, it is an object of the present invention to provide a clampless interconnection between a hose and a nipple.

This, and additional objects, advantages, features and benefits of the present invention will become apparent from the following specification.

DESCRIPTION OF THE PREFERRED EMBODIMENT

Figure 1:
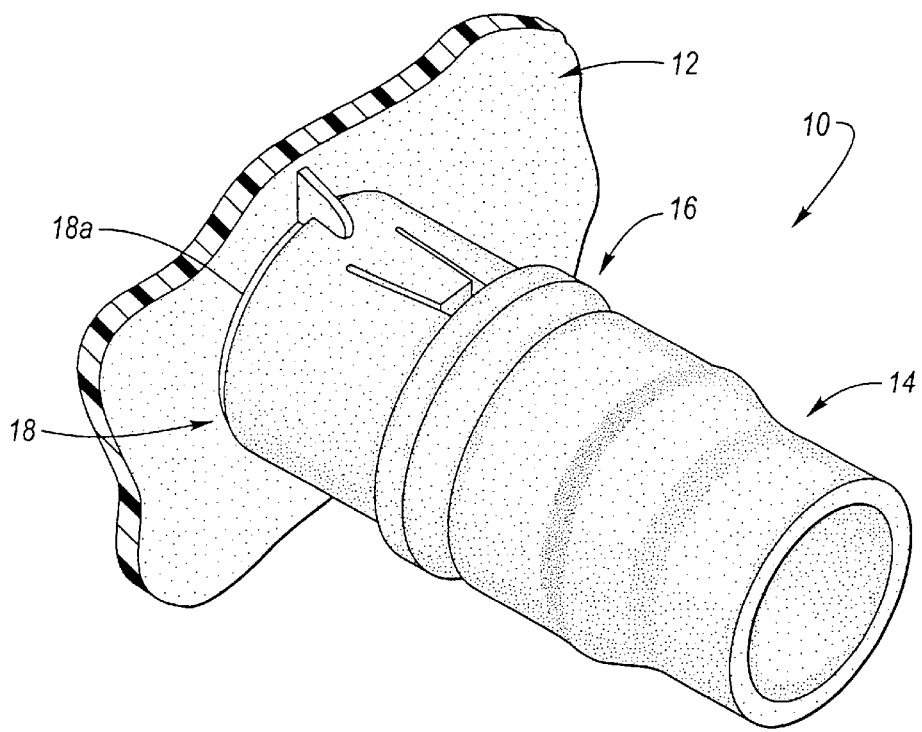
FIG. 1 is a perspective view of the clampless coupling according to the present invention, shown in operation with respect to a fluid system component and a hose.

Referring now to the Drawing, FIG. 1 depicts a clampless coupling 10 according to the present invention, shown by way of example operatively with respect to a fluid system component 12, here shown as a portion of an automotive radiator, and a hose 14. The clampless coupling 10 includes a connector 16, preferably composed of nylon, which is sealingly pre-connected with the hose 14, and further includes a nipple 18 (only a near end 18a thereof being visible) interfaced with the fluid system component 12. The connector 16 is sealingly interfaced with the nipple 18 by merely pushing the connector onto the nipple, there being no need for a clamp to secure a sealing state therebetween.

Figure 2:
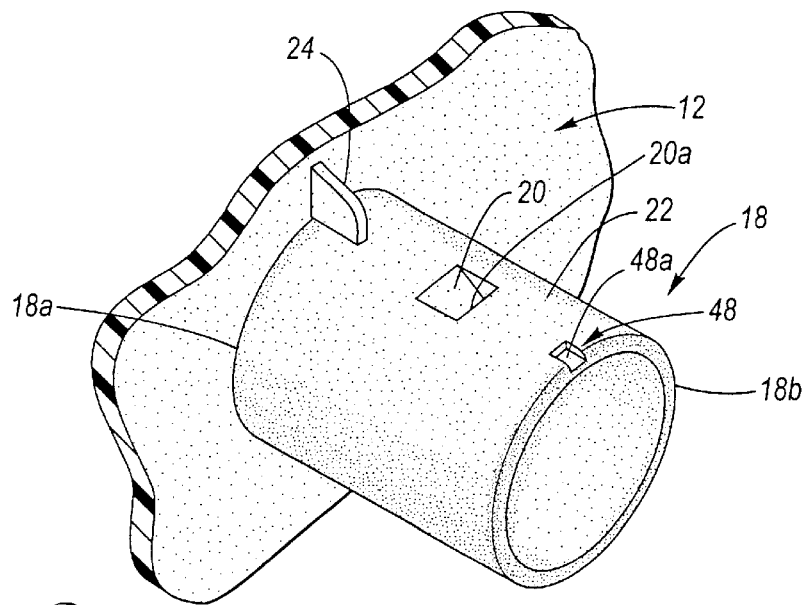
FIG. 2 is a perspective view of a nipple according to the present invention.

FIG. 2 depicts an example of the nipple 18. The nipple 18 is in the form of a generally cylindrical tube, having a radiused distal end 18b. The near end 18a is connected, such as by brazing if metal or by sonic welding or integral connection if plastic, to the fluid system component 12 so that fluid from the fluid system component is flowable therefrom and/or thereto through the nipple without leakage. The nipple features a pocket 20 formed into the outer nipple surface 22 having an abutment 20a. An alignment tab 24 is located at the rear end 18a and is radially upstanding with respect to the outside nipple surface 22 and axially oriented with respect to the nipple 18.

Figure 3A:
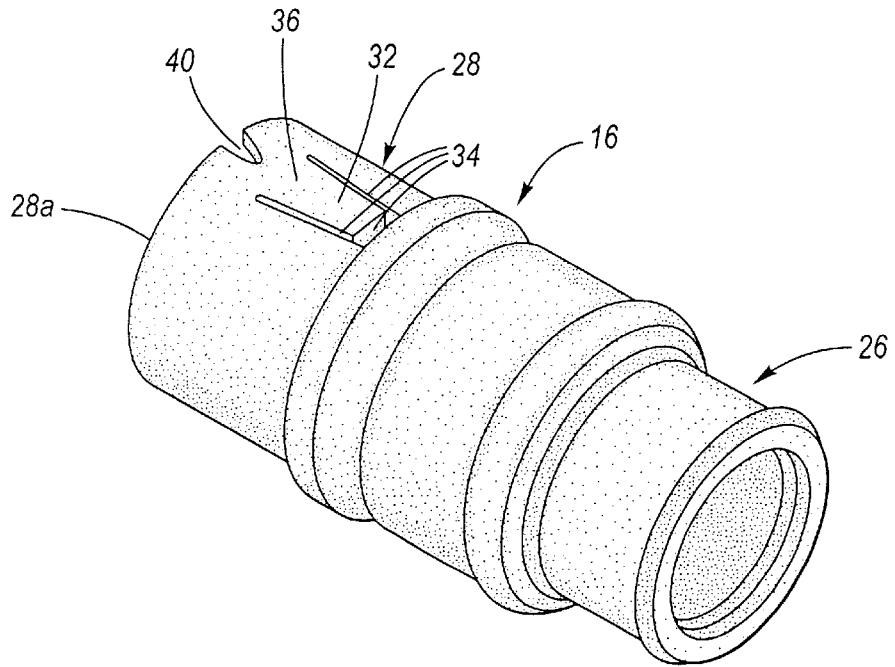
FIGS. 3A and 3B are perspective views of alternative connectors according to the present invention.

FIG. 3 depicts an example of the connector 16. The connector includes an annular stem 26 which is sized to tightly receive an end of a hose 14 (as shown at FIG. 1). In this regard, the hose is slipped over the stem 26 so as to provide a seal therebetween. It is preferred for the hose to be permanently secured to the stem, preferably by an adhesive, but it is possible to use another attachment agency or mechanism (which can include a clamp). The connector further includes a sleeve 28 opposite the stem 26. The sleeve has an inside sleeve surface 30 (see FIG. 4) is sized to receive therein the nipple 18 with but little play therebetween. A resilient lock arm 32 is formed in the sleeve 28, as for example by cuts 34, wherein a basal connection 36 of the resilient lock arm with the sleeve provides radially resilient deformation of the resilient lock arm with respect to the sleeve. A boss 38 (see FIG. 4) is formed on the resilient lock arm 32 opposite the basal connection 36 and protrudes outwardly from the inside sleeve surface 30 when the resilient lock arm is in a relaxed state. The forward end 28a of the sleeve 28 has an alignment notch 40 for interfacing with the alignment tab 24.

In order that the connector 16 be sealable with the nipple 18, an elastomeric O-ring seal 42 is provided at the inside sleeve surface 30 (see FIG. 4) which serves as a compression seal between the sleeve 28 and the nipple. In this regard, an annular groove 44 is formed on the inside sleeve surface, into which is placed the O-ring seal 42. The groove 44 serves to retain the O-ring seal captured on the sleeve 28. The groove 44 is dimensioned so that the O-ring seal 42 protrudes outwardly with respect to the inside sleeve surface 30.

Operation of the clampless coupling 10 will be detailed with reference now being additionally directed to FIGS. 4 through 9.

Figure 4:
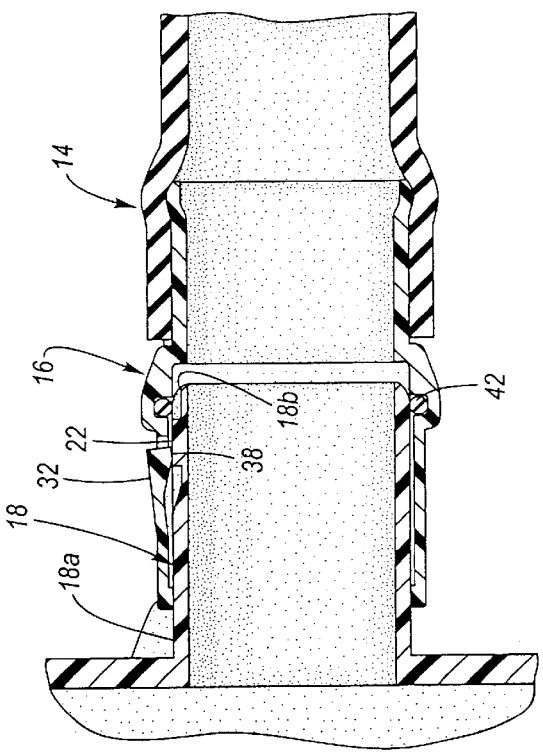
FIGS. 4 through 6 are progressive sectional side views of a nipple and connector according to the present invention being interconnected with each other.
Figure 5:
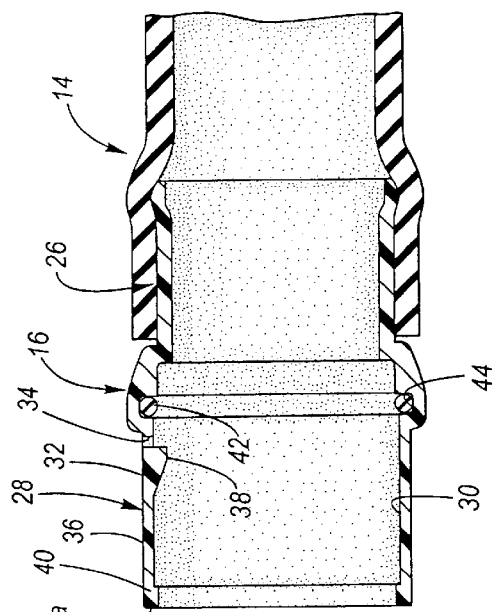
Figure 5:
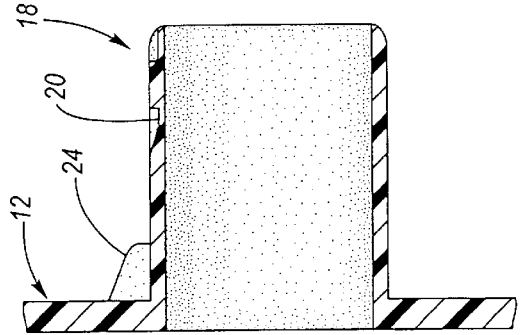
Figure 6:
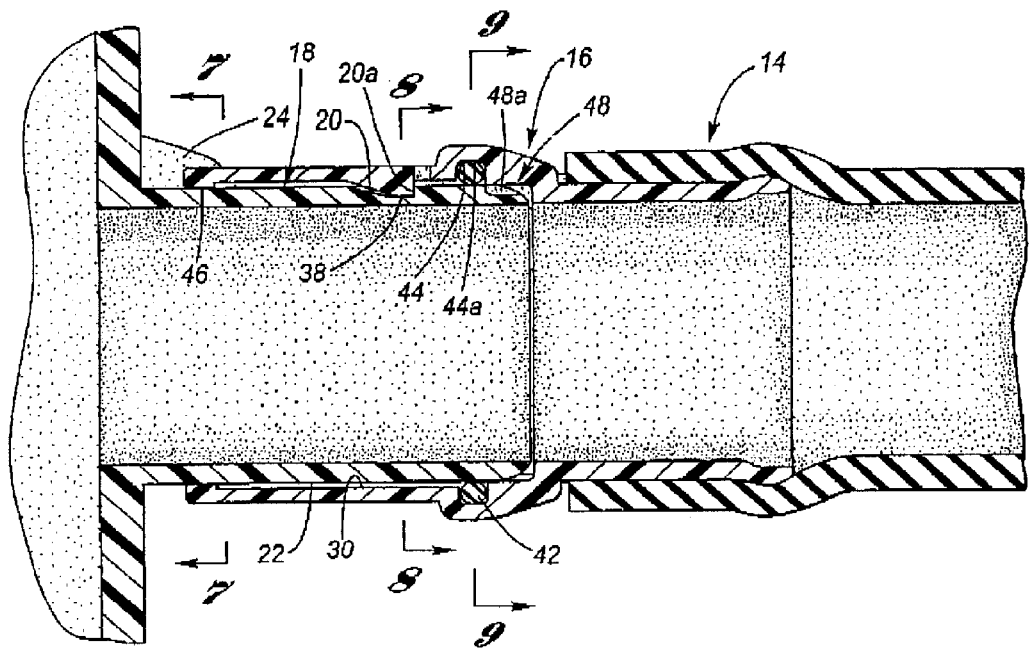
Figure 7:
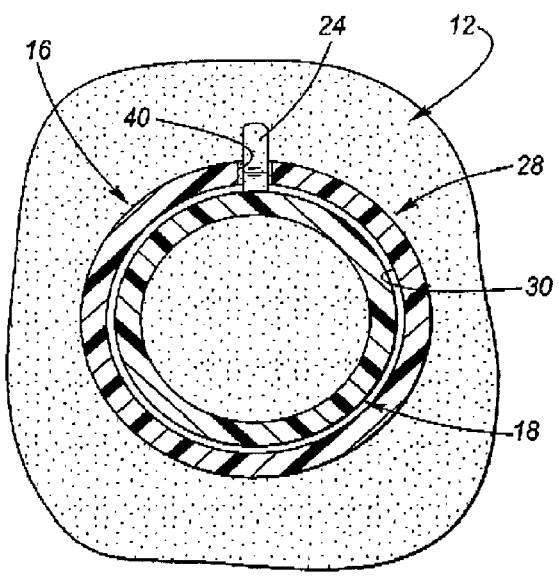
FIG. 7 is a partly sectional end view seen along line 7—7 of FIG. 6.
Figure 8:
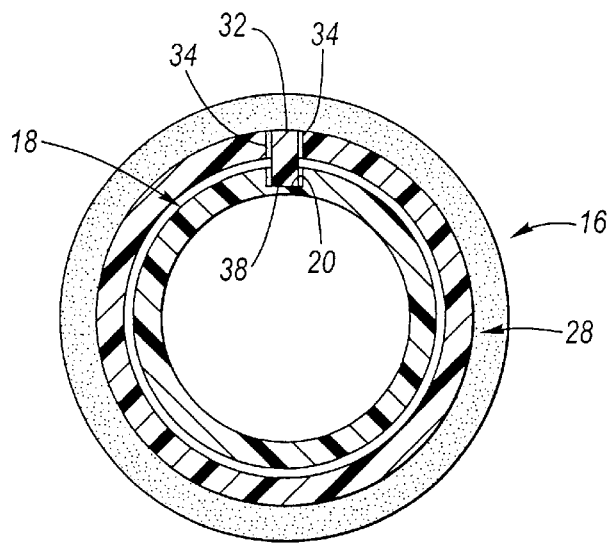
FIG. 8 is a partly sectional end view seen along line 8—8 of FIG. 6.
Figure 9:
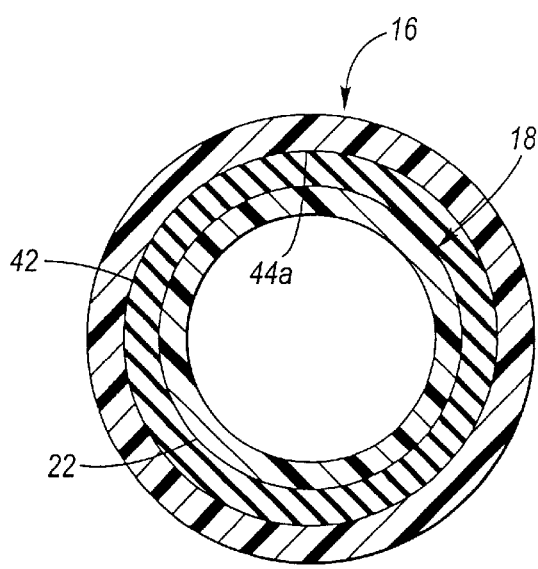
FIG. 9 is a partly sectional end view seen along line 9—9 of FIG. 6.

With the hose 14 pre-connected to the connector 16, a user grasps the connector and aligns it with the nipple 18, as shown at FIG. 4. Next, the user slides the sleeve 28 onto the nipple 18 by pushing the connector toward the near end 18a of the nipple, as shown at FIG. 5. As the sleeve slides over the nipple, the resilient lock arm 32 is resiliently pushed up away from the outer nipple surface 22 by abutment therewith by the boss 38. Continued sliding of the sleeve, as advanced from the depicted location at FIG. 5 to that depicted at FIG. 6, results in the O-ring seal 42 sliding onto the nipple by virtue of the radiused distal end 18b and sealingly compressing against the outer nipple surface in one direction, and the floor 44a of the groove 44 in the other, opposite, direction. FIG. 6 depicts the conclusion of the installation of the connector onto the nipple, wherein the alignment notch 40 has received the alignment tab 24 and, shortly thereafter, the boss has dropped into the pocket 20. In order to facilitate slipping of the sleeve 28 onto the nipple 18, it is preferred for the forward end 28a and the rearward end 28b of the sleeve to have an annular rib 46 which serves as the sliding interface and locating features of the sleeve relative to the nipple.

When the sleeve 28 is positioned onto the nipple 18 (as shown at FIG. 6) so that the boss 38 is firmly seated in the pocket 20, the O-ring seal 42 provides a secure compression seal between the sleeve 28 and the nipple 18. Further, the location of the boss into the pocket serves as an interfering abutment for the boss which prevents the connector 16 from backing-off from the nipple 18. Further still, the interaction of the alignment notch 40 and alignment tab 24 form an alignment assurance mechanism which aligns the connector on the nipple so that the boss is aligned with the pocket and further prevents axial rotation of the connector (and hose) with respect to the nipple. The seal provided by the clampless coupling 10 is effective whether the fluid is a gas or a liquid.

An additional preferred seal assurance feature 48 of the clampless coupling 10 can be understood by reference to FIGS. 2 and 6. The seal assurance feature 48 is preferably in the form of a slot 48a formed in the outer nipple surface 22 which communicates with the distal end 18b of the nipple 18. When the sleeve 28 is properly located on the nipple 18, as shown at FIG. 6, the slot 48a is closely spaced from the O-ring seal and the O-ring seal is everywhere annularly sealed with respect to the outer nipple surface 22. However, in the event a user might not fully seat the sleeve 28 onto the nipple 18, then the O-ring seal will lie over the slot 48a and the slot will then provide a fluid passage which bypasses the O-ring seal. When a pressure test of the fluid system is undertaken, this fluid bypass will make immediately known that there was a failure to fully seat the connector onto the nipple.

Figure 3B:
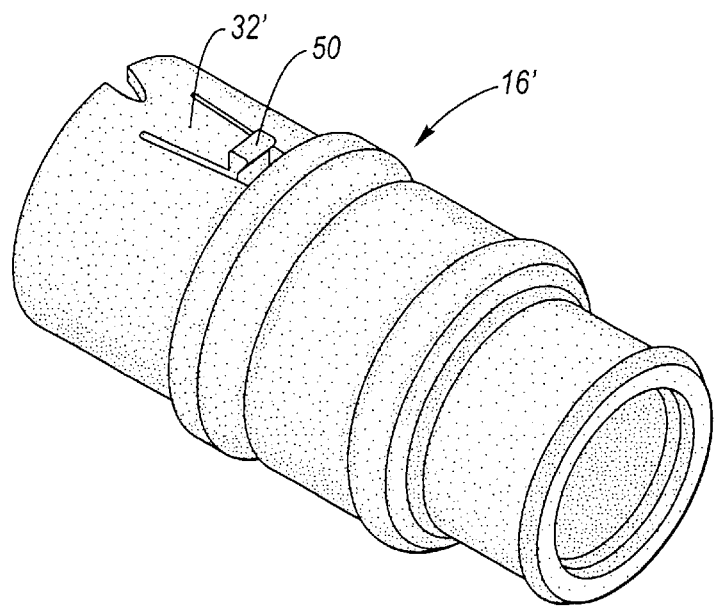

In the event a user may wish to remove the connector from a nipple to which it is attached, FIG. 3B depicts an alternative connector 16' having a resilient lock arm 32' which features a lip 50 for being pried radially upward by a tool, such as a flat-blade screwdriver. When the resilient lock arm is so pried, the boss is disengaged from the pocket, and the sleeve may now be backed-off from the nipple.

Figure 10:
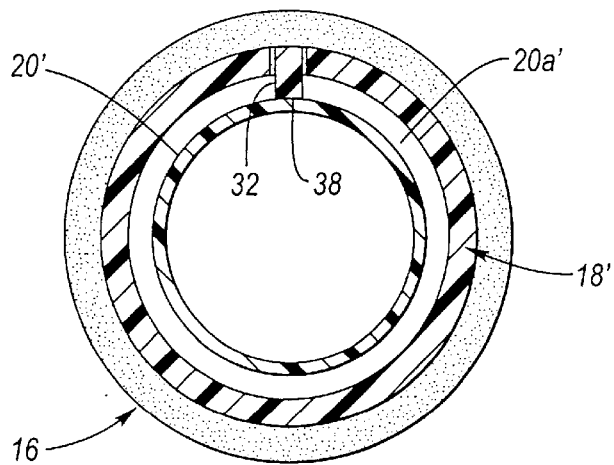
FIG. 10 is a partly sectional end view of an alternative connector, seen along a line similar to that of FIG. 8.

Lastly, FIG. 10 depicts an alternative nipple 18', wherein rather than having a pocket, an annular recess 20' is provided which accepts the boss 38 and abuts it via an annular abutment 20a' no matter how the connector 16 may be axially oriented relative to the nipple. In this embodiment, it is possible for the alignment tab and alignment notch to be obviated, be included as described hereinabove, or be configured to allow for interfacing at a selected number of possible orientations, as for example closely spaced notches spaced around the forward end of the sleeve to allow interfacing with a tab circumferentially indexed to the spacing of the notches.

To those skilled in the art to which this invention appertains, the above described preferred embodiment may be subject to change or modification. Such change or modification, such as for example a modification of the shape of the resilient lock arms, can be carried out without departing from the scope of the invention, which is intended to be limited only by the scope of the appended claims.

What is claimed is:

1. A clampless coupling for connecting a hose to a fluid system component, comprising:

a nipple having an outer nipple surface, said nipple having an abutment formed in said outer nipple surface; and a connector having a first end and an opposite second end, said first end comprising a sleeve, said sleeve having an inside sleeve surface configured for receiving said nipple, said sleeve comprising an annular seal member located at said inside sleeve surface, and a boss located at said inside sleeve surface;

wherein when said nipple is received into said sleeve, said boss is received by said abutment and said annular seal member seals said inside sleeve surface with respect to said outside nipple surface and a seal assurance feature formed on said nipple, said seal assurance feature comprising a slot communicating with a distal end of said nipple, and so that if the nipple and the connector are not properly seated so that the boss is not received by the abutment, a portion of the annular seal will overlie the slot to provide a fluid bypass to allow fluid to pass therethrough when a pressure test of the fluid system is undertaken.

2. The clampless coupling of claim 1, wherein said boss is connected to a resilient lock arm formed in said sleeve.

3. The clampless coupling of claim 1, wherein an annular groove is formed in said inside sleeve surface, and wherein said annular seal member is trapped in said annular groove.

4. The clampless coupling of claim 1, wherein said abutment comprises a pocket depressionally formed in said outside nipple surface.

5. The clampless coupling of claim 1, wherein said second end of said connector comprises a stem for attaching a hose thereto.

6. The clampless coupling of claim 1, further comprising an alignment assurance mechanism connected with said nipple and said connector for aligning said connector with respect to said nipple.

7. The clampless coupling of claim 6, wherein said abutment comprises a pocket depressionally formed in said outside nipple surface.

8. The clampless coupling of claim 7, wherein said alignment assurance mechanism comprises a tab connected with said nipple and a notch formed at a forward end of said sleeve, wherein when said notch receives said tab said connector is aligned with said nipple.

9. The clampless coupling of claim 5, wherein said boss is connected to a resilient lock arm formed in said sleeve.

10. The clampless coupling of claim 9, wherein an annular groove is formed in said inside sleeve surface, and wherein said annular seal member is trapped in said annular groove.

11. The clampless coupling of claim 10, further comprising a seal assurance feature formed on said nipple, said seal assurance feature comprising a slot communicating with a distal end of said nipple.

12. The clampless coupling of claim 10, further comprising an alignment assurance mechanism connected with said nipple and said connector for aligning said connector with respect to said nipple.

13. The clampless coupling of claim 12, wherein said abutment comprises a pocket depressionally formed in said outside nipple surface.

14. The clampless coupling of claim 13, wherein said alignment assurance mechanism comprises a tab connected with said nipple and a notch formed at said forward end of said sleeve, wherein when said notch receives said tab said connector is aligned with said nipple.

15. The clampless coupling of claim 14, further comprising a seal assurance feature formed on said nipple, said seal assurance feature comprising a slot communicating with a distal end of said nipple.

16. A hose and clampless coupling for connecting the hose to a fluid system component, comprising:

a hose having a hose end;

a nipple having an outer nipple surface, said nipple having an abutment formed in said outer nipple surface; and a connector having a first end and an opposite second end, said first end comprising a sleeve, said sleeve having an inside sleeve surface configured for receiving said nipple, said sleeve comprising an annular seal member located at said inside sleeve surface, and a boss located at said inside sleeve surface, said second end comprising a stem, said hose end being sealingly connected to said stem;

wherein when said nipple is received into said sleeve, said boss is received by said abutment and said annular seal member seals said inside sleeve surface with respect to said outside nipple surface and a seal assurance feature formed on said nipple, said seal assurance feature comprising a slot communicating with a distal end of said nipple, and so that if the nipple and the connector are not properly seated so that the boss is not received by the abutment, a portion of the annular seal will overlie the slot to provide a fluid bypass to allow fluid to pass therethrough when a pressure test of the fluid system is undertaken.

17. The hose and clampless coupling of claim 16, further comprising an alignment assurance mechanism connected with said nipple and said connector for aligning said connector with respect to said nipple; wherein said abutment comprises a pocket depressionally formed in said outside nipple surface; and wherein said alignment assurance mechanism comprises a tab connected with said nipple and a notch formed at a forward end of said sleeve, wherein when said notch receives said tab said connector is aligned with said nipple.

18. The hose and clampless coupling of claim 17, wherein said boss is connected to a resilient lock arm formed in said sleeve, said lock arm having a lip for providing a pry location to move said boss clear of said abutment; and wherein an annular groove is formed in said inside sleeve surface, and wherein said annular seal member is trapped in said annular groove.

* * * * *